US012798534B2

(12) United States Patent
Linden et al.

(10) Patent No.: US 12,798,534 B2

(45) Date of Patent: Nov. 17, 2026

(54) METHOD FOR OPERATING A BRAKE SYSTEM ASSEMBLY, AND BRAKE SYSTEM ASSEMBLY

(71) Applicant: Continental Automotive Technologies GmbH, Hannover (DE)

(72) Inventors: Ulrich Linden, Frankfurt am Main (DE); Bogdan Budianu, Oberursel (DE); Tom Kaufmann, Ippenschied (DE); Michael Wintzer, Frankfurt (DE)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 18/833,525

(22) PCT Filed: Jan. 25, 2023

(86) PCT No.: PCT/DE2023/200021
§ 371 (c)(1),
(2) Date: Jul. 26, 2024

(87) PCT Pub. No.: WO2023/143680
PCT Pub. Date: Aug. 3, 2023

(65) Prior Publication Data

US 2025/0145127 A1 May 8, 2025

(30) Foreign Application Priority Data

Jan. 26, 2022 (DE) ..................... 10 2022 200 845.6

(51) Int. Cl.
*B60T 8/88* (2006.01)
*B60T 8/171* (2006.01)
(Continued)

(52) U.S. Cl.
CPC .............. *B60T 8/885* (2013.01); *B60T 8/171* (2013.01); *B60T 8/172* (2013.01); *B60T 8/174* (2013.01);
(Continued)

(58) Field of Classification Search
CPC .......... B60T 8/885; B60T 8/171; B60T 8/172; B60T 8/174; B60T 8/94; B60T 2270/402;
(Continued)

(56) References Cited

FOREIGN PATENT DOCUMENTS

DE 102016215833 A1 3/2018

OTHER PUBLICATIONS

Search Report dated Nov. 17, 2022 from corresponding German patent application No. 10 2022 200 845.6.

(Continued)

*Primary Examiner* — Hai H Huynh

(74) *Attorney, Agent, or Firm* — Buchanan Ingersoll & Rooney PC

(57) ABSTRACT

A method for operating a brake system assembly includes evaluating input data and downgrading from a first mode to a second mode according to the result of the evaluation. The input data is a performance curve of the first mode and determining the performance curve includes using a torque-speed curve, a first mode-dependent characteristic curve with at least one mathematical formula. Evaluating the input data includes comparing an ascertained performance capability of the first mode according to the calculated performance characteristic with the performance capability of the second mode.

9 Claims, 4 Drawing Sheets

(51) Int. Cl.
*B60T 8/172* (2006.01)
*B60T 8/174* (2006.01)
*B60T 8/94* (2006.01)

(52) U.S. Cl.
CPC ........... *B60T 8/94* (2013.01); *B60T 2270/402* (2013.01); *B60T 2270/404* (2013.01); *B60T 2270/82* (2013.01)

(58) Field of Classification Search
CPC ........... B60T 2270/404; B60T 2270/82; B60T 13/662; B60T 17/22
USPC .............................................................. 701/70
See application file for complete search history.

(56) References Cited

OTHER PUBLICATIONS

International Search Report and Written Opinion dated May 3, 2023 from corresponding International patent application No. PCT/DE2023/200021.

METHOD FOR OPERATING A BRAKE SYSTEM ASSEMBLY, AND BRAKE SYSTEM ASSEMBLY

CROSS-REFERENCE TO RELATED APPLICATIONS

This application is a national stage application, filed under 35 U.S.C. § 371, of International Patent Application No. PCT/DE2023/200021, filed on Jan. 25, 2023, which claims priority to German patent application No. 10 2022 200 845.6, filed on Jan. 26, 2022, each of which is incorporated by reference.

TECHNICAL FIELD

The technical field relates to a method for operating a brake system assembly and a brake system assembly.

BACKGROUND

In previous brake systems, there is, on the one hand, a "by-wire" mode, in which the braking request is communicated to the actuator by the actuating device via signal transmission. On the other hand, there is a hydraulic fallback level, in which, for example, the braking request is transmitted to the actuators (hydraulic capacitance) by means of a linear actuator via valves (hydraulic resistance). In the said systems, braking normally takes place in by-wire mode. In certain situations, a downgrade to the hydraulic fallback level may take place in order to ensure that the vehicle can still be braked.

The point at which the switch takes place is ascertained using certain criteria, some of which represent a very hard limit. Influencing factors on the switching moment may be, inter alia, the environment (voltage, temperature) or the net electricity availability. If the voltage or current provided by the on-board energy supply falls below a threshold value, the ABS and other functions could be switched off, for example. If a temperature threshold value is exceeded, the maximum phase current is reduced, which then results in a lower power output. Moreover, a deviation between the setpoint and actual pressure could be monitored, and a downgrade activated if the system limits disrupt the current pressure increase/drop. On the whole, potential is often wasted—e.g., in that the switch to the hydraulic fallback level takes place even though by-wire braking would still have been possible. Moreover, an analysis as to whether a downgrade should take place is possible only if the brake is activated.

In this regard, a method is known from DE 10 2016 215 833 A1, for instance, which, starting from the current operating point of the actuator, calculates the possible maximum torque at the current speed and/or the possible maximum speed at the current load torque. From the operating reserve(s) ascertained thereby, it is derived whether the performance capability of the drive is sufficient to still be able to provide a requested system function. In this method, starting from an operating point of the actuator, the current reserve is therefore determined based on the difference from a characteristic curve. In other words, a downgrade is only possible once the brake is activated.

Therefore, there remains an opportunity to improve the downgrade process, to select the operating mode with the greatest performance in each situation, and to avoid unnecessary impairments and losses of brake power.

A method which may already ascertain the possible operating range before the brake is activated is therefore desirable.

SUMMARY

A method for operating a brake system assembly, wherein the brake system assembly includes an evaluation device and actuators, is disclosed and described herein. The brake system assembly may be operated in a first mode and in a second mode and the operation of the brake system assembly can be downgraded from the first mode to the second mode. The method includes providing input data for the evaluation device,
evaluating the input data via the evaluation device and
downgrading from the first mode to the second mode according to the result of the evaluation, wherein the input data is a performance curve of the first mode and the following steps for providing the performance curve are carried out:
ascertaining a torque-speed curve,
providing a first mode-dependent characteristic curve,
calculating the performance curve from the torque-speed curve and the first mode-dependent characteristic curve via at least one mathematical formula, wherein
the following step is carried out during the evaluation step:
comparing an ascertained possible performance capability of the first mode according to the calculated performance curve with the performance capability of the second mode.

The method according to the disclosure is advantageous in that electromechanical parameters are included in the calculation of the input data. These are easier to handle than the input data used in previous systems. Moreover, by means of the invention, a downgrade is now possible before the brake is activated. This is particularly advantageous since a downgrade during the braking procedure may result in an unpleasant sensation for the driver. The disclosed method therefore contributes to the fact that a switch during the braking procedure takes place in fewer cases.

The disclosed method enables the performance capability of an actuator of the brake to be ascertained across the entire operating range so that, before selecting a function, it can be decided whether all the operating points required for this function may be reached.

A further advantage of the method consists in that the operating points required by a function may be ascertained in the form of a characteristic curve from measurement data and the necessary performance capability of the actuator may then be clearly described.

Conversely, the performance capability or the behavior of a driver in the fallback level may also be ascertained in order to ascertain a comparison curve as a suitable switching criterion.

If the driver is identified in a brake system, for example, it would even be possible to store an individual switching criterion This could in turn be taught into the fallback level during a "calibration journey".

The performance capability of the actuator or the actuators is relayed to the software which may then initiate the downgrade. The downgrade strategy is adaptable here and a reallocation of the deceleration request to other actuators (e.g., to the electronic drive or the individual wheel steering) is possible.

In one embodiment, the first mode-dependent characteristic curve is provided by ascertaining the derivative of a second mode-dependent characteristic curve.

In one embodiment, the first mode is a by-wire mode. By-wire mode here is understood to mean that the brake system is designed such that the actuating and control devices are mechanically uncoupled from one another and the transmission of the actuating request between the actuating device and actuator (control devices) takes place via digital signal transmission.

In one embodiment, the second mode is a hydraulic mode or a mechanical mode. In hydraulic mode, the brake system is configured in such a way that the actuating request can be transmitted hydraulically (hydraulic brake system). In this case, a linear actuator, a hydraulic resistor (valves and brake lines) and the actuator or the actuators are connected to one another in succession. In mechanical mode, an electromechanical brake system is provided so that the actuating request is transmitted electrically and may apply the actuators mechanically—and thereby actuate the brake.

In one embodiment, the first mode-dependent characteristic curve is a characteristic curve which is dependent on the second mode. It is either a pressure-volume curve, if the second mode is a hydraulic mode, or it is a force-travel curve, if the second mode is a mechanical mode.

In one embodiment, the performance curve is designed as a pressure-pressure gradient curve in the case of the hydraulic mode or as a force-force gradient curve in the case of the mechanical mode.

In one embodiment, the evaluation device determines five operating points on the performance curve. It is then analyzed whether at least three of the five operating points on the performance curve may be implemented by the brake system. In one embodiment, a downgrade is performed if it has been ascertained that fewer than three of the five operating points on the performance curve may be implemented. The downgrade may therefore take place later than was previously possible. Braking in by-wire mode is therefore ensured over a longer time period than in the prior art.

In one emboidment, for determining a strategy for the downgrade, the following further steps are carried out:

- calculating pressure drop gradients taking into account one or more of the following parameters: permitted regenerative power, temperature of an internal energy sink, permitted phase currents and
- determining the strategy for the downgrade on the basis of the calculated pressure drop gradients.

The time period in which by-wire braking is possible is therefore further expanded.

In a further embodiment, the inertia of the motor or a linear actuator is disregarded in the calculation of the input parameters. The calculation may be based on the assumption that the pressure develops in the same way in all brake calipers. It is therefore possible to describe the maximum dynamics of the pressure increase and pressure drop via the relationship between the wheel pressure and its time derivative. This characteristic curve is then preferably compared with various scenarios (e.g., normal braking function (Nbrake) with reduced voltage and hydraulic fallback level). It is thus advantageously achieved that, in each situation, the mode with the highest performance may be selected and it is therefore prevented that unnecessary downgrades with a loss of brake power occur.

In a further embodiment, the performance capability of the second mode is measured and stored. It is then available for calculating the performance curve.

A brake system assembly is also disclosed, wherein the brake system assembly is designed in such a way that the method described above can be carried out.

All in all, the following advantages may be realized:

- The performance capability of the brake system assembly (including driver properties) can be described on the basis of physical properties and can therefore be made comparable. This may also be used, for example, for statistical studies and trials.
- The implementation takes place in a microprocessor and the invention may be used for the downgrade concept (switching between function modes).
- The information may be used as a feedback variable for high-level feedback control systems (manipulated variable limit).
- The information may be used as a feedback variable for limiting the expected performance in contouring error monitoring.
- The information relating to the system performance capability may be provided at an interface, e.g., for smart actuators (e.g., when one or more electrohydraulic or electromechanical brake actuators are operated as a black box by a higher-level system).
- The information about the performance capability of the individual actuators is used to detect different braking effects at different wheels not only in the course of the braking procedure. Moreover, an overall performance capability of the brake system may be derived.

DESCRIPTION OF THE DRAWINGS

Further embodiments emerge from the following description of example embodiments on the basis of figures.

in which, by way of example and in a schematic view.

DETAILED DESCRIPTION

Figure 1:
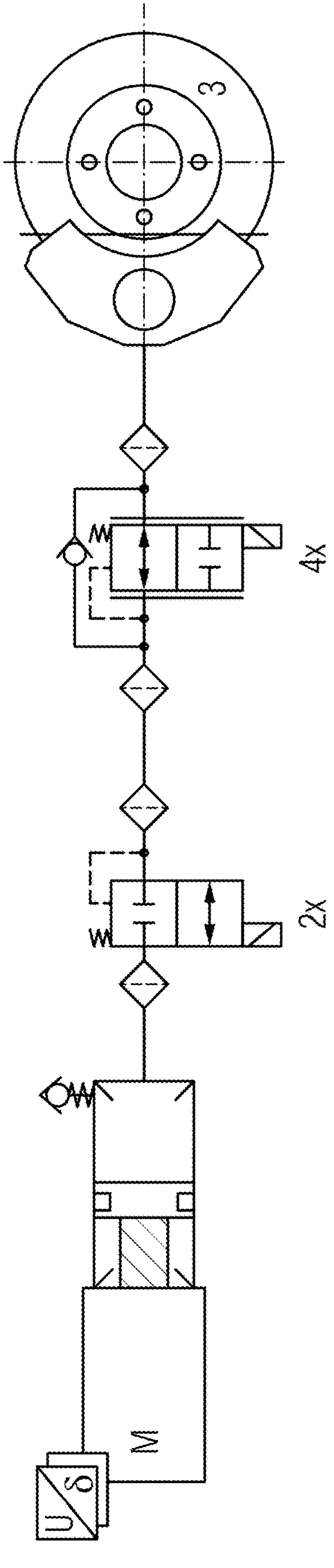
FIG. 1 shows some of the components of an electrohydraulic brake system.

FIG. 1 shows some of the components of an electrohydraulic brake system having a linear actuator 1, valves 3, and an actuator 5, which are connected in succession.

Figure 2:
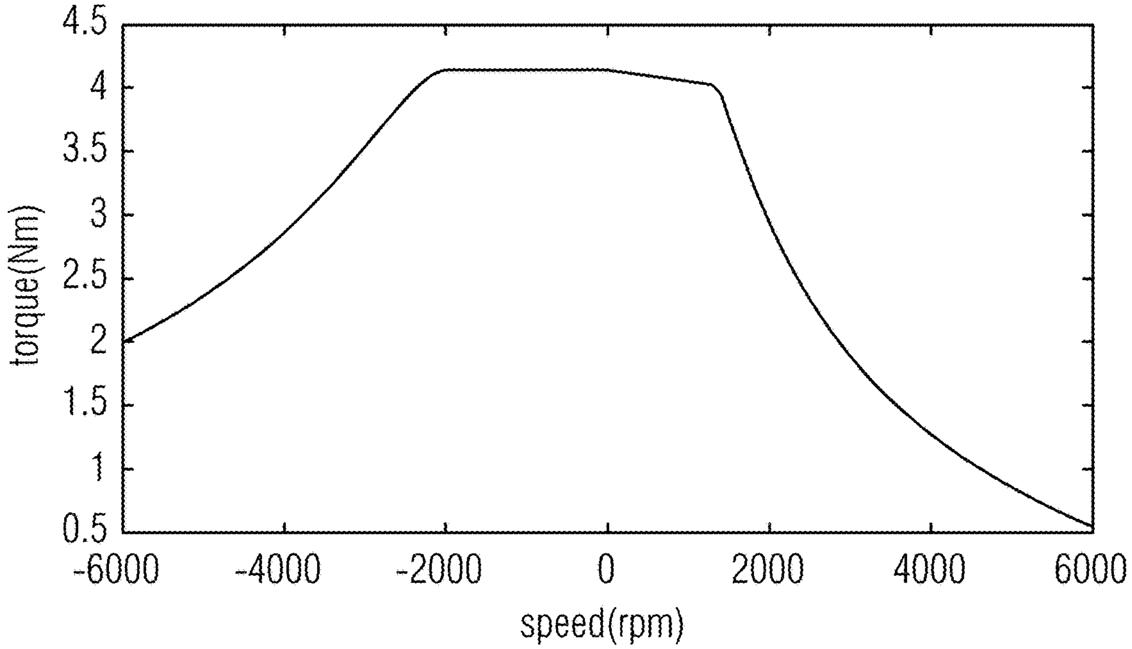
FIG. 2 shows a torque-speed curve (motor curve)

FIG. 2 shows a motor curve with the speed on the X axis and the torque on the Y axis. It represents an input parameter for calculating the performance curve of the first mode.

Figure 3:
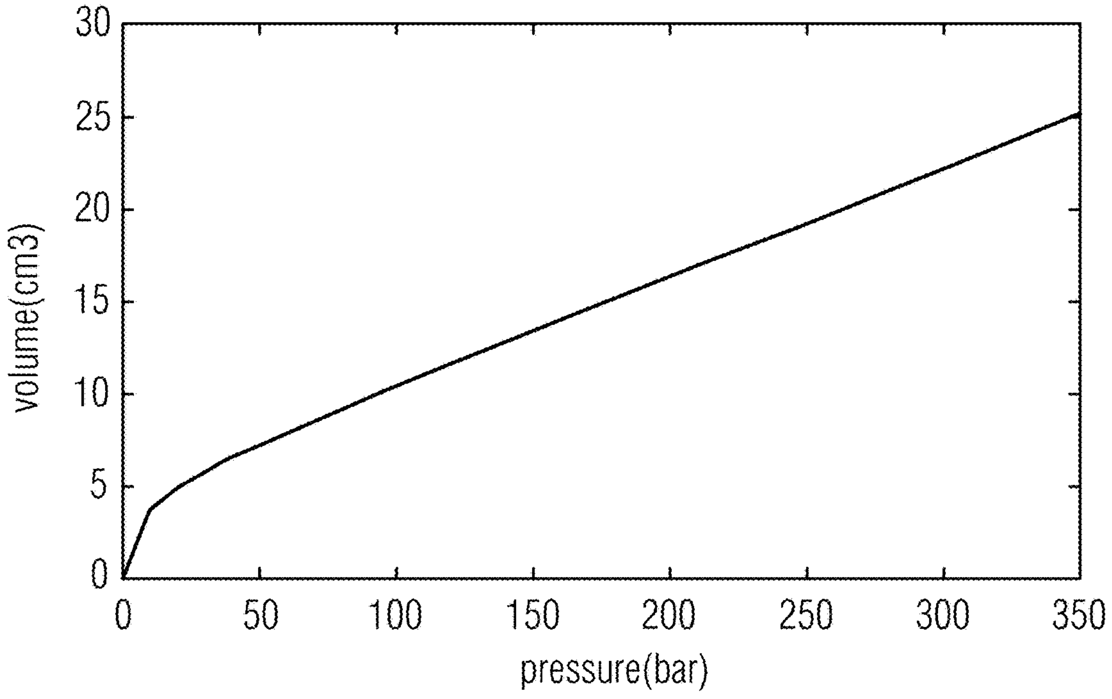
FIG. 3 shows a volume-pressure curve of the actuators.
Figure 6:
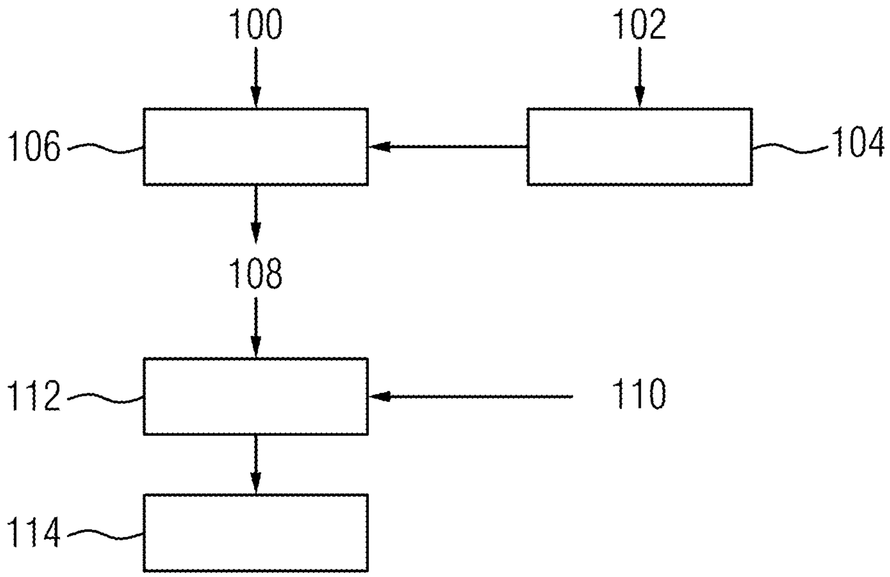

FIG. 3 shows a volume-pressure curve of the actuators and is likewise an input parameter for calculating the performance curve of the first mode. The volume-pressure curve represents a property of the brake calipers and may be ascertained either dynamically or once. In the case of a one-time ascertainment, the characteristic curve is stored and used later for calculating the performance curve of the first mode. The volume-pressure curve is the second mode-dependent characteristic curve 102 (see. FIG. 6).

Figure 4:
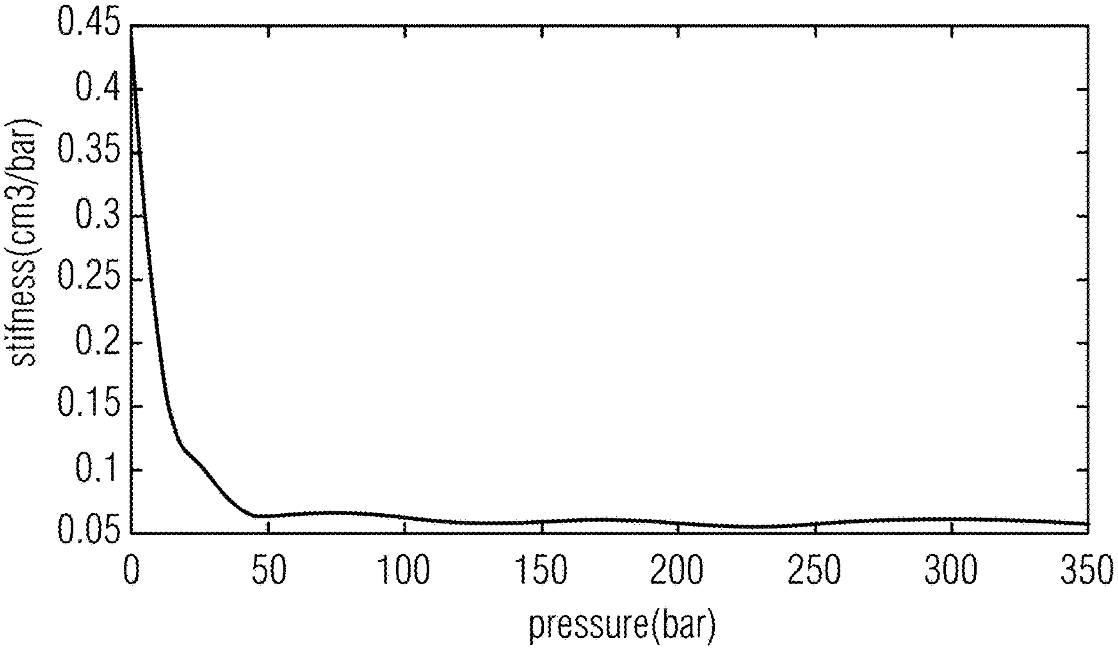
FIG. 4 shows a curve which represents the derivative of the volume-pressure curve of FIG. 3.

FIG. 4 shows the derivative of the volume-pressure curve from FIG. 3. The characteristic curve of FIG. 4 is therefore ascertained from the volume-pressure curve via differential calculation or via a derivative function. It represents the first mode-dependent characteristic curve 104 (see FIG. 6).

Figure 5:
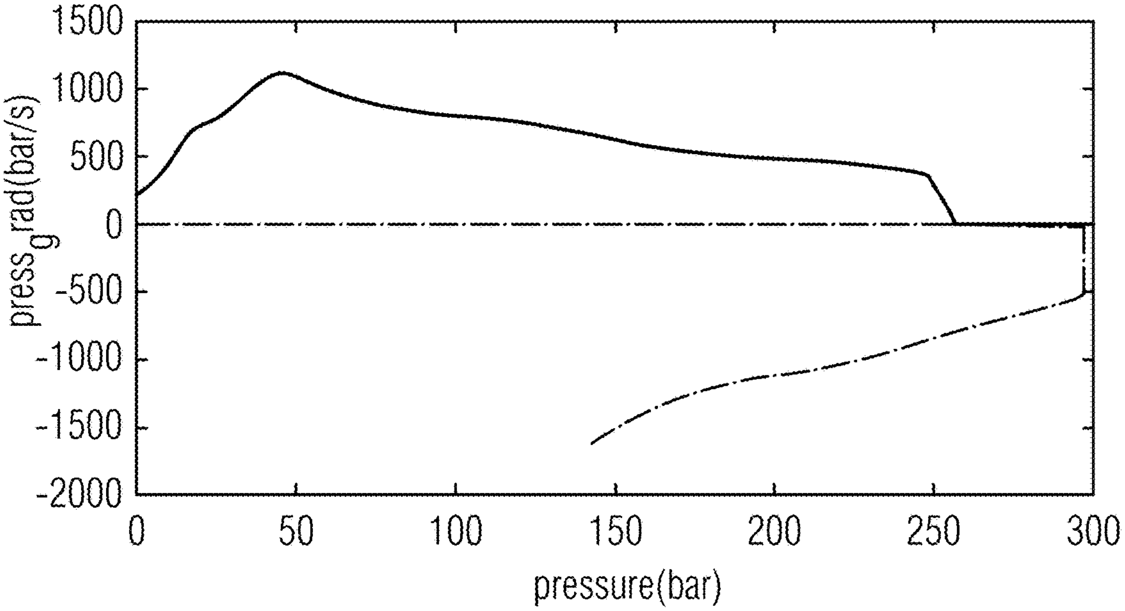
FIG. 5 shows a pressure-pressure gradient curve (performance curve of the linear actuator) and FIG. 6 shows a flow chart of the method.

FIG. 5 shows a pressure-pressure gradient curve, which represents the performance curve of the first mode, specifically of the linear actuator. It is ascertained via a calculation from the motor curve (torque-speed curve) and the derivative of the volume-pressure curve. The pressure is plotted on the X axis and the pressure gradient is plotted on the Y axis.

The calculation in the case of an electrohydraulic brake system may appear as follows:

$$\frac{dV}{dt} = \frac{dV(p)}{dp} \cdot \frac{dp}{dt} \text{ becomes} \tag{1}$$

$$\frac{dp}{dt} = \frac{\frac{dV}{dt}}{\frac{dV}{dp}} \tag{2}$$

(3) may then be inserted in (2)

$$\frac{dV}{dt} = \omega \cdot \text{Area}_{LAC} \cdot \text{Pitch}_{LAC} \tag{3}$$

This gives:

$$\frac{dp}{dt} = \frac{\omega \cdot \text{Area}_{LAC} \cdot \text{Pitch}_{LAC}}{\frac{dV(p)}{dp}} \tag{4}$$

The derivative of the volume-pressure curve is inserted as dV(p)/dp in (4).

(3) may moreover be inserted in (5), wherein Pdrop is measured in bar and "25"=25 bar (10^5 Pa) signify $$p_{drop} = 25 \cdot \left(\frac{dV}{dt} \cdot \frac{1}{q_{25}}\right)^2 \tag{5}$$

$$P_{LAC} = \frac{T_{motor} \cdot 2 \cdot \pi}{\text{Pitch}_{LAC} \cdot \text{Area}_{LAC}} \tag{6}$$

(5) and (6) are then inserted in (7)

$$P_{caliper} = P_{LAC} - P_{drop} \tag{7}$$

(7) may then likewise be inserted in (4).

Following from (7) V=V(p)

In a electromechanical brake system, the calculation may appear as follows:

$$F = F(x) \tag{10}$$

or $$X = X(F) \tag{11}$$

$$X = \frac{dx}{dt} = \frac{dx}{dF} \cdot \frac{dF}{dt} \tag{12}$$

$$\frac{dF}{dt} = \frac{\frac{dx}{dt}}{\frac{dx}{dF}} \tag{13}$$

-continued $$\frac{dx}{dt} = K \cdot \omega_{in} \tag{14}$$

$$F = K \cdot M_{in} \tag{15}$$

(14) and (15) are inserted in (13). This gives (16)

$$\frac{dF}{dt} = \frac{K \cdot \omega}{\frac{dx}{dF}(F)} \tag{16}$$

dx/dF(F) is the derivative of the force-travel curve here and $$K = \frac{\text{Pitch}}{2 * \pi}$$

The respective performance curve (pressure-pressure gradient curve or force-force gradient curve) is the performance capability of the first mode. It is then compared with the performance capability of the second mode. This performance capability of the second mode is either ascertained dynamically or ascertained once and stored.

FIG. 6 shows a flowchart for the method, in which the steps explained above are shown again.

A second mode-dependent characteristic curve 102 is derived (derivative 104). This derived first mode-dependent characteristic curve 104 is included in a calculation 106, together with a torque-speed curve 100. This gives a performance curve of the first mode 108 (performance capability of the first mode). This is compared with a performance capability of the second mode 110 (comparison 112). On the basis of the result of the comparison 112, a downgrade 114 of the brake system may then take place or a strategy for a downgrade may be devised and then carried out.

Moreover, it is possible for the sequence to also include the step in which five points are defined on the performance curve of the first mode and it is ascertained whether at least three of the five points in the current configuration can be implemented. If this is the case, a downgrade does not take place, which means that the system operates in the first mode (by-wire mode) for the maximum time. However, if fewer than three points can be implemented, a downgrade of functions takes place.

In this regard, inter alia, the following steps for providing the performance curve 108 are carried out:

- ascertaining the torque-speed curve 100,
- ascertaining the derivative 104 from a second mode-dependent characteristic curve 102,
- calculating the performance curve 108 from the torque-speed curve 100 and the derivative 104 of the second mode-dependent characteristic curve 102 via at least one mathematical formula.

LIST OF REFERENCE SIGNS

1 Linear actuator
3 Valves
5 Actuator
100 Torque-speed curve
102 Second mode-dependent characteristic curve
104 First mode-dependent characteristic curve (derivative of the second mode-dependent characteristic curve 102)
106 Calculation

108 Performance curve of the first mode
110 Performance capability of the second mode
112 Comparison
114 Downgrade Legend to Formulae F=Force
V=Volume
p=Pressure
x=Travel
ω=Speed
t=Time
in=Input
LAC=Linear actuator
T=Temperature
Caliper
Drop=Pressure drop across valve
Pitch
Area
$q_{25}$=Volume flow at 25 bar pressure difference
M=Torque

The invention claimed is:

1. A method for operating a brake system assembly, wherein the brake system assembly comprises an evaluation device comprising an electronic controller and actuators, wherein the brake system assembly can be operated in a first mode and in a second mode, and the operation of the brake system assembly can be downgraded from the first mode to the second mode, said method comprising:

providing input data for the evaluation device;
evaluating the input data with the evaluation device; and
switching the brake system assembly, by the evaluation device and the actuators, from the first mode to the second mode based on a result of the evaluation and;
wherein the input data is a performance curve of the first mode and providing the performance curve comprises
ascertaining a torque-speed curve,
providing a first mode-dependent characteristic curve,
calculating the performance curve from the torque-speed curve and the first mode-dependent characteristic curve using at least one mathematical formula;
wherein evaluating the input data comprises comparing an ascertained performance capability of the first mode according to the calculated performance curve with the performance capability of the second mode;
wherein the first mode-dependent characteristic curve is provided by ascertaining the derivative of a second mode-dependent characteristic curve via differential calculation or a derivative function.

2. The method as set forth in claim 1, wherein the first mode is a by-wire mode.

3. The method as set forth in claim 1, wherein the second mode is a hydraulic mode or a mechanical mode.

4. The method as set forth in claim 1, wherein the second mode-dependent characteristic curve is either a pressure-volume curve, if the second mode is a hydraulic mode, or the second mode-dependent characteristic curve is a force-travel curve, if the second mode is a mechanical mode.

5. The method as set forth in claim 4, wherein the performance curve is designed as a pressure-pressure gradient curve, if the second mode is a hydraulic mode, or is designed as a force-force gradient curve, if the second mode is a mechanical mode.

6. The method as set forth in claim 1, wherein, by utilizing the evaluation device, five operating points on the performance curve are determined and it is then ascertained whether at least three of the five operating points on the performance curve may be implemented by the brake system.

7. The method as set forth in claim 6, wherein a downgrade is performed if it has been ascertained that fewer than three of the five operating points on the performance curve may be implemented.

8. The method as set forth in claim 1, further comprising determining a strategy for the downgrade, comprising:

calculating pressure drop gradients taking into account one or more of the following parameters: permitted regenerative power, temperature of an internal energy sink, and permitted phase currents; and
determining the strategy for the downgrade on the basis of the calculated pressure drop gradients.

9. A brake system assembly, comprising:

an evaluation device comprising an electronic controller; and
actuators;
wherein the brake system assembly can be operated in a first mode and in a second mode;
the evaluation device configured to receive input data;
evaluate the input data; and
switch the brake system assembly, by at least one of the electronic controller and the actuators, from the first mode to the second mode based on a result of the evaluation;
wherein the input data is a performance curve of the first mode and providing the performance curve comprises
ascertaining a torque-speed curve,
providing a first mode-dependent characteristic curve, and calculating the performance curve from the torque-speed curve and the first mode-dependent characteristic curve using at least one mathematical formula,
wherein evaluating the input data comprises comparing an ascertained performance capability of the first mode according to the calculated performance curve with the performance capability of the second mode
wherein the first mode-dependent characteristic curve is provided by ascertaining the derivative of a second mode-dependent characteristic curve via differential calculation or a derivative function.

* * * * *